United States Patent [19]

Stephens

[11] Patent Number: 4,596,269
[45] Date of Patent: Jun. 24, 1986

[54] DIFFERENTIAL PRESSURE-ACTUATED VALVE WITH CLEAN BIAS CHAMBER

[75] Inventor: James B. Stephens, La Crescenta, Calif.

[73] Assignee: Coast Foundry and Manufacturing Company, Pomona, Calif.

[21] Appl. No.: 586,909

[22] Filed: Mar. 9, 1984

[51] Int. Cl.[4] .................... F16K 31/122; F16K 31/34; F16K 31/26; F16K 33/00

[52] U.S. Cl. ...................................... 137/413; 92/244; 137/436; 137/437; 137/444; 210/323.2; 210/390; 251/43; 277/63

[58] Field of Search ............... 137/413, 414, 436, 437, 137/444; 92/242, 243, 244; 251/43, 44, 46; 210/390, 323.2, 474; 277/63, 152

[56] References Cited

U.S. PATENT DOCUMENTS

| | | | |
|---|---|---|---|
| 2,531,672 | 11/1950 | Daye | 92/244 |
| 2,599,498 | 6/1952 | Suska | 137/414 |
| 2,654,482 | 10/1953 | Robinson et al. | 210/356 |
| 2,690,939 | 10/1954 | Whaley | 92/244 |
| 3,131,611 | 5/1964 | McLaughlin | 92/244 |
| 3,182,569 | 5/1965 | Hieber | 92/243 |
| 3,443,485 | 5/1969 | Van Dranen | 92/244 |
| 3,618,629 | 11/1971 | Heyer et al. | 137/413 |
| 3,893,475 | 7/1975 | Hudson | 251/46 |
| 4,013,091 | 3/1977 | Hudson | 137/414 |

FOREIGN PATENT DOCUMENTS

| | | | |
|---|---|---|---|
| 1162715 | 9/1958 | France | 137/413 |
| 2370 | of 1879 | United Kingdom | 210/474 |

Primary Examiner—G. L. Walton
Attorney, Agent, or Firm—Donald D. Mon

[57] ABSTRACT

A differential pressure-actuated valve with a piston slidable to open or to close an inlet port. The piston slides in a cylindrical wall, and separates a bias chamber and a flow chamber. The piston is fitted with two oppositely-directed lip seals, one of which seals against bias chamber pressure, and the other of which scrapes particulate matter off of the wall. Optionally, an elongated filter extends from the piston into an inlet pipe where it filters water which flows to the bias chamber. The filter may have a perforated mesh wall, or a solid wall with an open end.

11 Claims, 3 Drawing Figures

DIFFERENTIAL PRESSURE-ACTUATED VALVE WITH CLEAN BIAS CHAMBER

FIELD OF THE INVENTION

This invention relates to a differential pressure-actuated valve, and in particular to a valve of this type with means to maintain its bias chamber relatively free of particulate material.

BACKGROUND OF THE INVENTION

Differential pressure-actuated ballcock valves are used to control the flow of water (or other liquid) from a source pipe to a user item such as a sink, urinal, or commode. Customarily they utilize a piston which carries a seal that is moved by it to open or to close a seat and thereby to control flow through the valve. The operating position of the piston is determined by whether a bias chamber at one face of the piston is vented, or is closed and contains liquid under a pressure approximating that in the source pipe.

A well-known valve of this type is manufactured by Coast Foundry and Manufacturing Company, Pomona, Calif. under the mark "Magic Float". This valve is fully described in Heyer et al U.S. Pat. No. 3,618,629, issued Nov. 9, 1971. This patent is incorporated herein by reference in its entirety for its showing of the general structure and operation of such a valve in which the improvements that are the subject matter of this invention can readily be included to its advantage.

The said Heyer patent has been a very successful product. But occasionally, after long use, especially in very dirty water, i.e., water which contains much sediment and particulates, the valve closes sluggishly, or even hangs open for an extended period of time.

Investigation has shown that at least some of these problems are caused by particulates which get underneath the seal around the piston so as to frustrate development of a sufficient differential pressure in the bias chamber (or to retard it), and the accumulation of particulates in the bias chamber.

It is an object of this invention to provide a ballcock valve without these disadvantages, and a piston to enable this result.

BRIEF DESCRIPTION OF THE INVENTION

The invention is carried out in a differential pressure-actuated ballcock valve which includes an inlet pipe with an inlet seat. The seat has a sealing plane lying normal to the axis of the valve. A body is attached to, or includes, the inlet pipe and inlet seat, with an internal cavity in fluid communication with the inlet seat. A cylindrical wall is axially aligned with the axis, and bounds a portion of the cavity. A piston makes a sliding fluid sealing contact with the cylindrical wall so as to move axially toward and away from the inlet seat. The piston carries a valve seal which seats on the inlet seat in one piston position, to prevent fluid flow past the inlet seat. It permits such flow when it moves away from the inlet seat.

The piston divides the cavity into a flow chamber and a bias chamber. An outlet port departs from the flow chamber to provide water to a using device. The piston has a hole through it that extends from within the valve seal to the bias chamber, whereby the bias chamber is always in fluid communication with the inlet pipe. A vent port can selectively be opened to vent the bias chamber and lower the pressure therein so the valve will open or close to enable pressure to build up so the valve will close.

According to a feature of this invention, a peripheral seal is carried by the piston, which makes a sliding fit with the cylindrical wall. This seal has a first tapered lip facing toward the bias chamber to prevent leakage from it past the first tapered lip, and a second tapered lip facing toward the flow chamber to prevent leakage from the flow chamber past the second tapered lip, and more importantly to scrape particulates off of the cylindrical wall to frustrate their reaching the first peripheral lip and spoiling its sealing action. This action also discourages particulates from entering the bias chamber.

According to a preferred but optional feature of the invention, a long tubular filter extends from the hole through the piston, well into the inlet pipe. This filter may be of two different types, and these types may even advantageously be combined. One such type is a closed wall, open ended tube of substantial length, whose length is such that the very slow and occasional flow of water to the bias chamber is so very slow and occasional that it permits particulates to settle back into the inlet pipe.

Another type is a mesh-like tube, whose end may be closed so that all flow is through the mesh, or open so that some can also flow through the open end as above. The outer wall of the tube will be washed by water flowing past it, so the filter remains clean when filtration is through the wall. Particulates are not objectionable in the flow chamber, because they will be washed out by flushing flow, and the seal around the piston will exclude particulates from the bias chamber.

The above and other features of this invention will be fully understood from the following detailed description and the accompanying drawings in which:

BRIEF DESCRIPTION OF THE DRAWINGS

FIG. 3 is a cross-section taken at line 3—3 in FIG. 1.

DETAILED DESCRIPTION OF THE INVENTION

Figure 1:
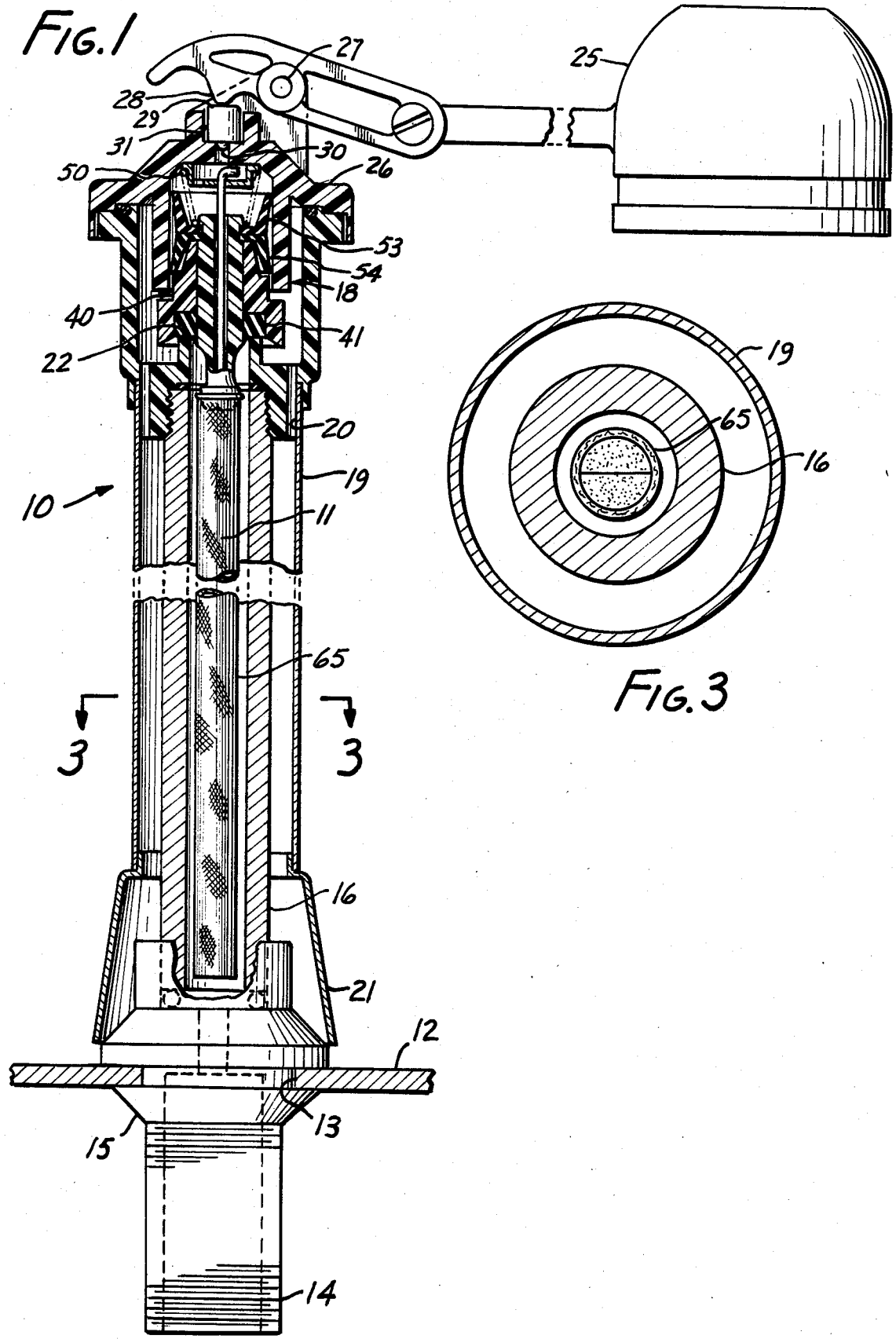
FIG. 1 is an axial cross-section showing the presently preferred embodiment of the invention.

A ballcock valve 10 incorporating the invention is shown in FIG. 1. It has an axis 11, and is attached to the bottom 12 of a water tank (not shown) at a hole 13 therethrough. A threaded connector 14 is connectable to a water pipe or riser, and a threaded nut 15 holds the assembly in place. This is a completely conventional arrangement.

An inlet pipe 16 forms part of the valve, and is a continuation of the connection at the tank bottom. It is also a structural member, and supports valve workings 18 at its upper end. A hush tube 19 surrounds the pipe and is radially spaced from it so as to receive water from an outlet port 20. Water flows into the tank from the hush tube from beneath a skirt 21 at the bottom of the hush tube or through perforations in its wall.

At the upper end of the inlet pipe there is a valve seat 22. This valve seat lies in a plane normal to the valve axis. Control of water flow past valve seat 22 is the ultimate function of the valve.

The valve is actuated by a float 25 which is mounted to a valve body 26 by a pivot 27. An actuating arm 28 is adapted to press down on a valve closure 29 so as to close vent port 30 when the tank is full. The float will rise when the tank is full. When the float drops because the water level has receded, the lightweight closure 29 will be lifted off its seat by water pressure below it and the water can flow past it through axial grooves 31. Thus the float is the functioning control for the valve and exerts control over the workings for water close or to open it to flow past valve seat 22.

Figure 2:
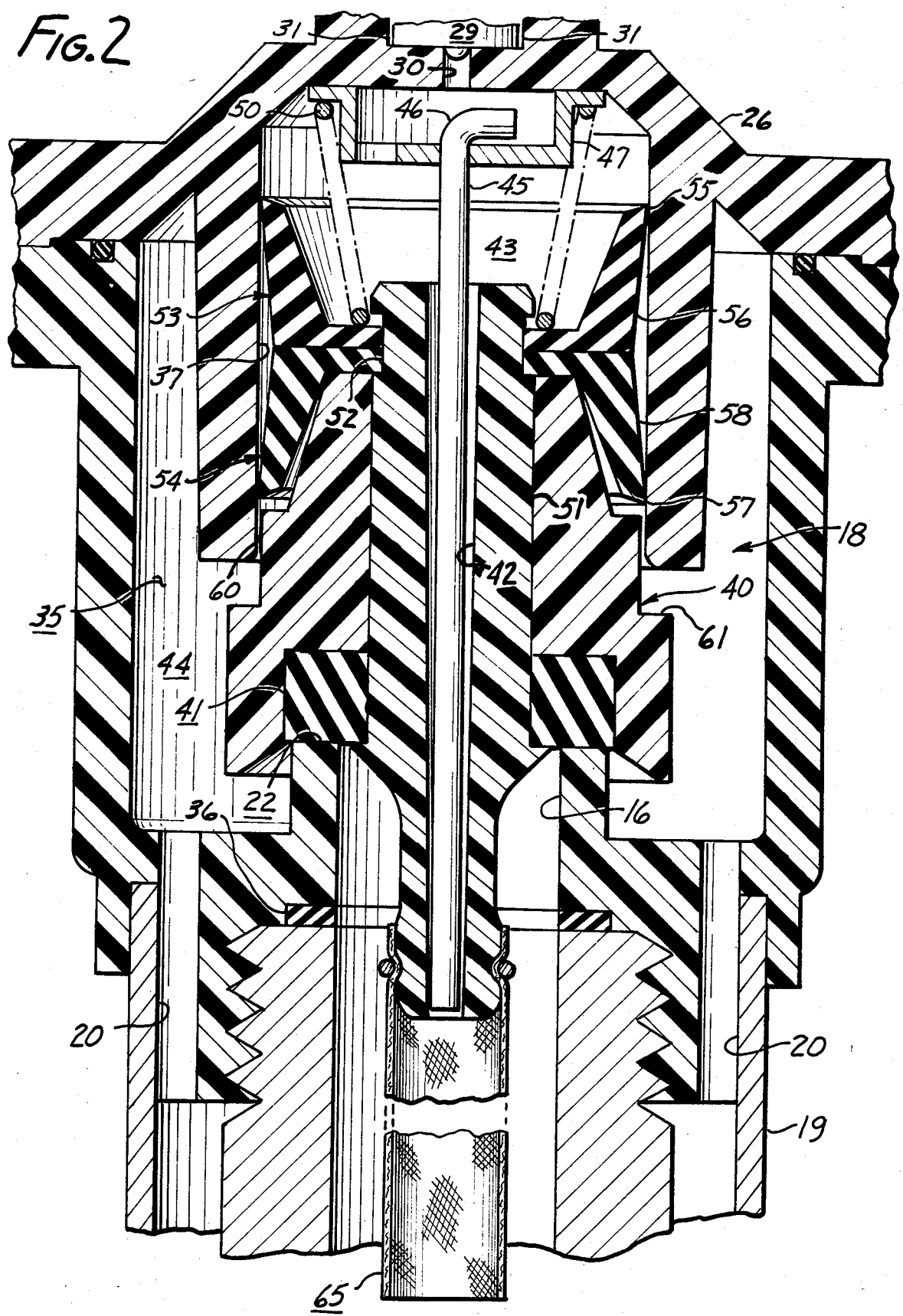
FIG. 2 is an enlarged portion of FIG. 1.

As best shown in FIG. 2, body 26 has a cavity 35 into which the inlet pipe opens through the valve seat, and out of which fluid will depart through the outlet port. The inlet pipe is shown continued above a washer 36, this part of the pipe forming a portion of the valve body itself. The body is threaded or otherwise attached to the lower part of the inlet pipe.

A cylindrical wall 37 aligned with axis 11 forms part of the boundary of the cavity, and receives a piston 40 which is slidable therein. At its lower end the piston carries a valve seal 41 adapted to bear against valve seat 22. The closed inlet seat in the condition shown in FIG. 2 is respective to a full tank. The piston has a hole 42 extending from its face in the inlet pipe to a bias chamber 43 at the other face. The piston divides the cavity into said bias chamber and into a flow chamber 44. When the valve is open, fluid flows from the inlet pipe through the flow chamber, and out the outlet port.

Hole 42 is axial and has inside it a small rod 45 whose lateral dimensions are smaller than those of the hole. It has a bend 46 at its upper end so that it does not fall out of the hole. Its purpose is to keep the hole clean by rattling around during flow conditions and also to establish the size of the flow channel through the hole as the difference between the diameter of the hole and of the rod. These are very conventional relationships. The bent-over upper end of the rod is shown being held in a shelf 47 above the piston so the rod does not fall out.

A bias spring 50 bears between the upper end of the bias chamber and the upper face of the piston. As best shown in FIG. 2, the body includes a spindle 51 having a peripheral groove 52 in which a pair of cup seals 53 and 54 are fitted. The lower end of the bias spring bears against the uppermost one of the cupped seals and preferably hooks slightly under the edge of the groove to help hold the sliding seals in place.

The shape of the cup seals is of importance to this invention. First cup seal 53 includes a tapered lip 55 which bears against the cylindrical wall and points toward the flow chamber. There is a relief 56 between the major portion of this tapered lip so as to provide for some resiliency and to reduce the drag of the seal. The lip tends to keep the pressure in the bias chamber.

Second cup seal 54 includes a second tapered lip 57 which faces into the flow chamber and it has a relief 58. The second tapered lip is relatively stiffer but still flexible enough to make a good seal and still accomplish its function of scraping dirt off of the cylindrical wall to exclude dirt from the region of the relief thereby to protect the upper cup seal from being disabled by dirt, and to discourage it from reaching the bias chamber. The lips may have a durometer hardness of about 60.

A spacing 60 exists between the body and the cylindrical wall to avoid interference between them. A shoulder 61 on the body limits the upper movement of the body.

In order to exclude as much dirt and particulate matter from the bias chamber as possible, a filter 65 is formed at the bottom of the piston and extends for a substantial distance, perhaps four to six inches, into the inlet pipe. The preferred embodiment of this filter is a mesh cylinder made of nylon material. One such example is Ben-Har Expando Grade PT self-fitting protective oversleeve manufactured by Bently-Harris Mfg. Co., Lionville, Pa. This material comes in fine weaves and may exclude material down into the micron range, if desired. Thus the material is an extended perforated wall, and flow past it will tend to wash this portion clean. It is best practice to close the lower end of this filter as shown in FIG. 3, by pinching it shut, when a mesh is used but it is not necessary to do so, because the flow rate through the hole in the piston is so very slow. Because the flow rate is so very slow, instead of utilizing a mesh filter, it is equally possible to use an open ended tube within an imperforate wall. This is because during the time between actuations, the particulate matter will have a chance to settle out of the tube and it is unlikely to enter the hole on re-flushing because of the small volume of fluid which is vented from the bias chamber each time the valve is actuated.

The cross-section of the cylindrical wall is greater than the cross-section of the inlet seat, and this provides for a bias force. However, the bias spring is conveniently provided to assist the closing action of the valve under low pressure operations.

While the given example is a ballcock valve wherein the means for opening and closing the vent port is a water level responsive float assembly, the invention is equally useful for the flush valves. The flush valve construction is identical, except that instead of opening and closing the vent port with a level responsive device, it is opened by pressing a button or other actuator to open it. It is reclosed as a function of time, such as by a time-delayed spring assembly, or a bleed-rate controlled fluid rate assembly. Thus this invention is not to be limited to ballcocks, but is applicable to all types of valves in which a differential pressure is utilized to control open-closed action.

Thus this invention provides a piston assembly which overcomes the disadvantages of certain earlier ballcock valves in that by providing the lower tapered lip, the upper tapered lip is protected against particulate matter so that the valve becomes more reliable. Furthermore, by providing a filter, especially of the type described, the upper flow chamber itself may be operated with very clean water with less likelihood of the chamber's silting up, or of particulate matter's creeping past the upper tapered lip.

This invention is not to be limited by the embodiments shown in the drawings and described in the description which are given by way of example and not of limitation, but only in accordance with the scope of the appended claims.

I claim:

1. In a valve having: an upwardly extending inlet pipe; and inlet seat fixed to and terminating said inlet pipe and having a sealing plane lying normal to an axis of the valve; a body attached to the inlet pipe, said body having an internal cavity communicable with the inlet seat; a cylindrical wall axially aligned with said axis and bounding a portion of said cavity; a piston making a sliding fluid sealing contact with said cylindrical wall so as to move without axial physical restrained into the inlet seat, the piston dividing the cavity into a flow chamber and a bias chamber, the flow chamber being on the side of the piston closer to the inlet seat and the bias chamber being on the opposite side therefrom; a valve seal on one face of said piston facing toward said inlet seat and adapted to seal against it and prevent flow past it in one axial position of the piston, said piston having a hole therethrough extending from within said valve seal to said bias chamber: a vent port through said body from said bias chamber; a metering pin being disposed in said hole; and means adapted to open and to close said vent port so as to control the position of the piston, the cross-section of the cylindrical wall being greater than that of the inlet seat, the improvement comprising:

a first and a second peripheral sliding seal surrounding said piston and extending between said piston and said cylindrical wall, said sliding seals being in back-to-back abutting engagement between said piston and means for holding the metering pin in said hole via spring means, the first of said sliding seals having a sealing lip directed toward said bias chamber and the second of said sliding seals having a sealing lip directed toward said flow chamber, whereby said first sliding seal maintains pressure in said bias chamber, and said second sliding seal scrapes particulates from said cylindrical wall to discourage them from reaching the first seal;

each said sliding seal having a tapered lip directed as stated, which contacts the said wall adjacent to the free end of said lip, and said tapered lip being relieved from said cylindrical wall for a substantial distance from the place of said contact of said lip; and an elongated flexible tube connected to the bottom of said piston dangling downwardly from it without restraint and extending a substantial distance into said inlet pipe, said tube communicating with said hole in said piston to receive water to flow upwardly through said hole to said bias chamber from said inlet pipe to substantially eliminate particulate matter within the water, there being no filter means between the flexible tube and the bias chamber.

2. Apparatus according to claim 1 in which said tube has a wall which is perforated by many small perforations to filter out particulates.

3. Apparatus according to claim 2 in which the free end of said tube is closed.

4. Apparatus according to claim 2 in which the free end of said tube is open.

5. Apparatus according to claim 2 in which the major portion of the wall of the tube is imperforate, and in which the free end is open.

6. Apparatus according to claim 1 in which said means to open or close the vent port is water level-responsive, the valve being a ballcock type.

7. Apparatus according to claim 1 in which said tube has a perforate wall.

8. Apparatus according to claim 7 in which the free end of said tube is closed.

9. Apparatus according to claim 7 in which the free end of said tube is open.

10. Apparatus according to claim 1 in which the major portion of a wall of said tube is imperforate, and in which the free end of it is open.

11. Apparatus according to claim 1 in which each of said sliding seals includes a lip fitted into the same groove on the body, and in which a bias spring in the bias chamber presses said flanges against said body and against each other.

* * * * *